(12) United States Patent
Wier

(10) Patent No.: US 6,206,315 B1
(45) Date of Patent: Mar. 27, 2001

(54) UNIT COMPRISING AT LEAST TWO TORSION BARS FOR LIMITING THE FORCE IN A BELT RETRACTOR

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/326,078

(22) Filed: Jun. 4, 1999

(30) Foreign Application Priority Data

Jun. 4, 1998 (DE) .......................... 298 10 005 U
Apr. 14, 1999 (DE) .......................... 299 06 629 U

(51) Int. Cl.⁷ ................................................ B60R 22/28
(52) U.S. Cl. .......................................................... 242/379.1
(58) Field of Search ........................ 242/379.1; 280/805, 280/806; 297/470, 471, 472

(56) References Cited

U.S. PATENT DOCUMENTS 3,857,528   12/1974   Fiala .
5,522,564    6/1996   Schmidt et al. .
5,820,058 *  10/1998  Hirzel et al. ................ 242/379.1
5,961,060 *  10/1998  Brambilla et al. ........... 242/379.1

FOREIGN PATENT DOCUMENTS 19653510    6/1997  (DE) .
19733787   12/1998  (DE) .
 9632303   10/1996  (WO) .
 9749583   12/1997  (WO) .

* cited by examiner

*Primary Examiner*—John M. Jillions
(74) *Attorney, Agent, or Firm*—Tarolli, Sundheim, Covell, Tummino & Szabo L.L.P.

(57) ABSTRACT

A unit comprises at least a first and a second torsion bar for limiting the force in a belt retractor. The first torsion bar is hollow, and the second torsion bar is arranged in the interior of the first torsion bar. The first torsion bar has an inner diameter which is at least in part selected such that the first torsion bar is supported at least in a twisted condition by the second torsion bar.

11 Claims, 9 Drawing Sheets

UNIT COMPRISING AT LEAST TWO TORSION BARS FOR LIMITING THE FORCE IN A BELT RETRACTOR

The invention relates to a unit comprising at least two torsion bars for limiting the force in a belt retractor.

BACKGROUND OF THE INVENTION

One such assembly using a first, hollow torsion bar and a second torsion bar arranged in the interior of the first torsion bar is known from German published patent application 196 53 510. This unit allows, for instance in a collision, that belt webbing can be withdrawn in overcoming a predetermined resisting force to diminish peak loads in the seat belt and thus the resulting risk of injury to the restrained vehicle occupant. The resistance to withdrawal of the belt webbing is determined by the moment of torsional resistance effective in each case. This resistance may be adapted to the individual requirements by alternatively activating one or the other torsion bar or by commonly activating both thereof.

The disadvantage with this known belt retractor is that varying the resulting characteristic of the resisting force over the length of the withdrawn belt webbing necessitates a complicated and bulky mechanism which switches the various torsion bars as desired with the necessary safety.

The object of the invention consists in providing a unit for limiting the force in a belt retractor in which the resulting characteristic of the belt webbing withdrawal force can be varied over the length of the withdrawn belt webbing as desired, without making any complicated external control mechanisms necessary for the switching action.

BRIEF DESCRIPTION OF THE INVENTION

For this purpose there is provided a unit comprising at least a first and a second torsion bar for limiting the force in a belt retractor. The first torsion bar is hollow, and the second torsion bar is arranged in the interior of the first torsion bar. The first torsion bar has an inner diameter which is at least in part selected such that the first torsion bar is supported at least in a twisted condition by the second torsion bar. This results in a further parameter with which the moment of torsional resistance furnished as a whole by the two torsion bars may be varied. A hollow torsion bar tends namely to constrict or completely collapse when exposed to high loads. The second torsion bar serving to support the first torsion bar influences the resisting moment provided by the first torsion bar at the point in time at which the support begins to become effective. Thus, very many different operating conditions may be established, for example a shearing off of the first torsion bar or a predetermined shortening of the first torsion bar which may be made use of to pull it out of a mount initially serving for transmission of force, so that it is no longer involved in transmitting the torque.

BRIEF DESCRIPTION OF THE DRAWINGS

The invention will now be described by way of various embodiments as illustrated in the attached drawings in which.

DETAILED DESCRIPTION OF THE INVENTION

Figure 1:
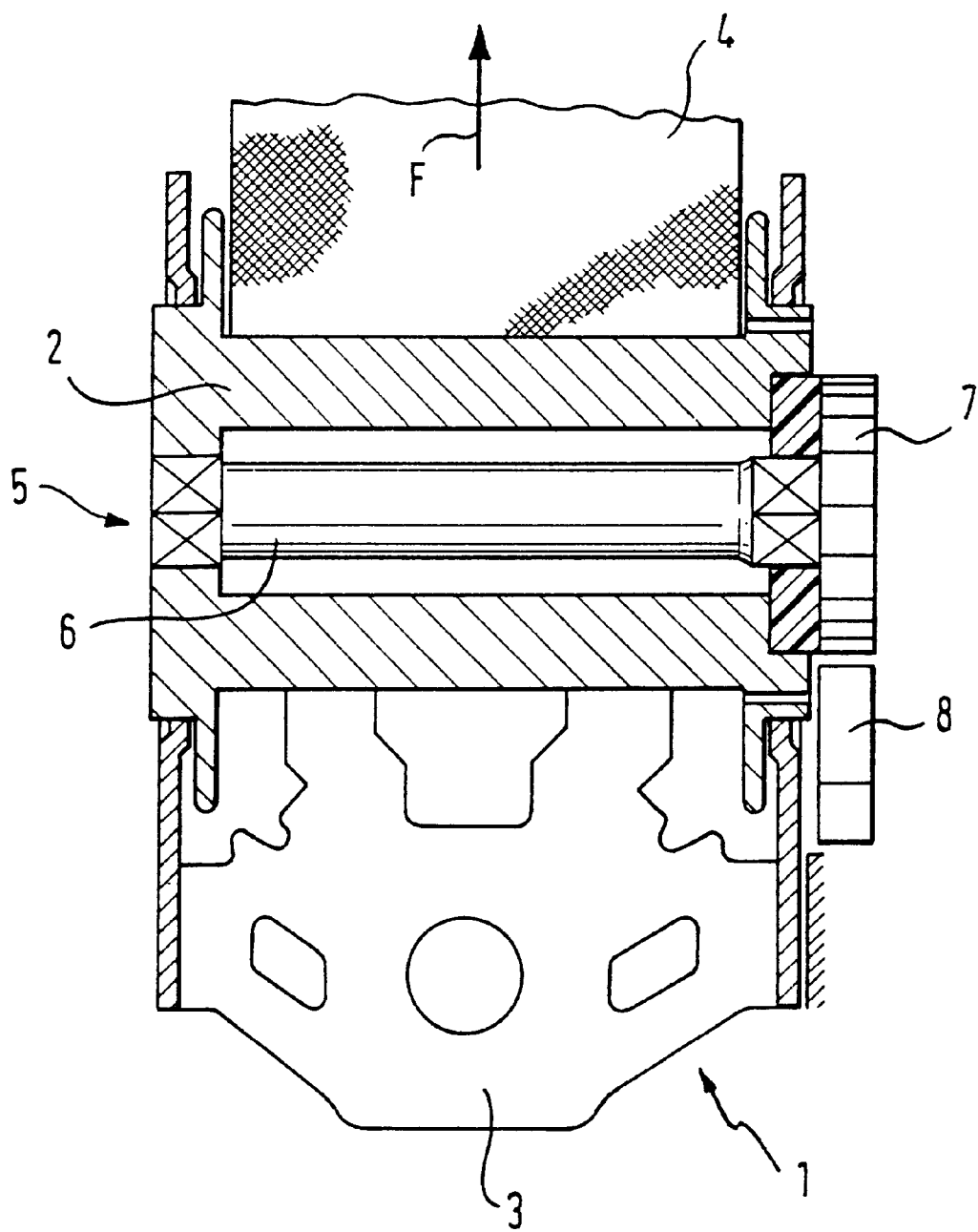
FIG. 1 is a section view of a belt retractor including a unit in accordance with the invention.

Referring now to FIG. 1 there is illustrated a belt retractor 1 including a belt reel 2 rotatably mounted in a frame 3 adapted to be installed in a vehicle. Coiled on the belt reel 2 is a belt webbing 4 which may serve to restrain a vehicle occupant in a collision so that the occupant is involved in the deceleration of the vehicle. Arranged in the interior of the belt reel is a unit 5 consisting in general of a deformation means 6 connected at one end (on the left as shown in FIG. 1) non-rotatably to the belt reel and provided at the opposite end with a locking toothing 7. A locking pawl 8 may be caused to engage the locking toothing 7 by ways and means known as such.

When a tensile force F is effective in the belt webbing 4, which force exerts a torque on the belt reel 2 exceeding a resisting torque as applicable by the deformation means 6, then the belt webbing 4 is withdrawn from the belt reel, the deformation means 6 being twisted between its end fixedly secured to the belt reel and its end non-rotatably held by the locking pawl 8 and the locking toothing 7. The configuration of the deformation means 6 as well as the characteristics achievable thereby as regards the belt webbing withdrawal force F over the length of the withdrawn belt webbing will now be described with reference to the following Figures.

Figure 2:
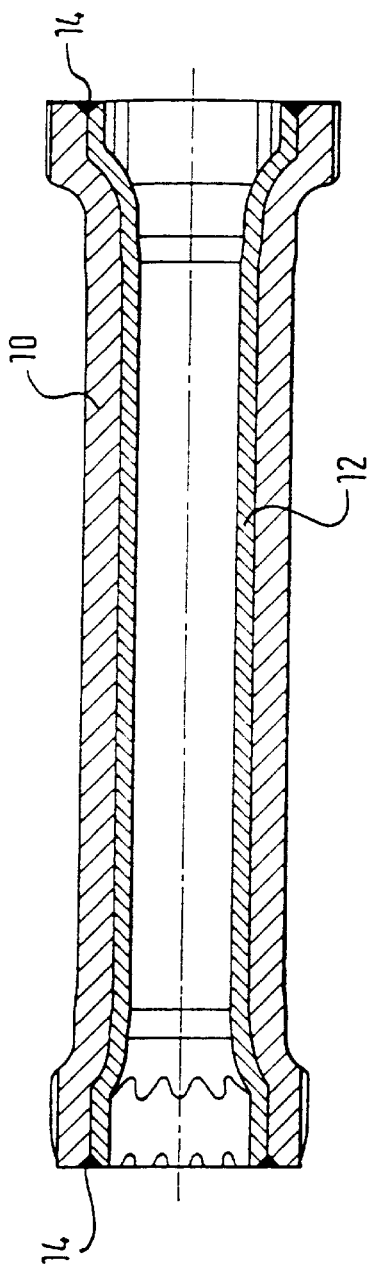
FIG. 2 is a section view of a unit in accordance with a first embodiment of the invention.

Referring now to FIG. 2 there is illustrated a deformation means in accordance with a first embodiment of the invention. The deformation means is a unit comprising a first torsion bar 10 configured hollow, and a second torsion bar 12 arranged in the interior of the first torsion bar. The two torsion bars 10, 12 are fixedly connected to each other at both the first axial end, on the left as shown in FIG. 2, and at the second axial end, on the right as shown in FIG. 2, this being symbolized in this case by welds 14. The two torsion bars may also be configured, however, with a spline, for example, so that they engage each other with an interlocking fit. To facilitate assembly, the second torsion bar 12 may be made available as a tube section which is inserted into the interior of the first torsion bar 10 and is then widened at both its axial ends.

It is to be noted that the notation for identifying the first and second axial ends of the two torsion bars as used above is also maintained in describing the further embodiments.

Figure 3:
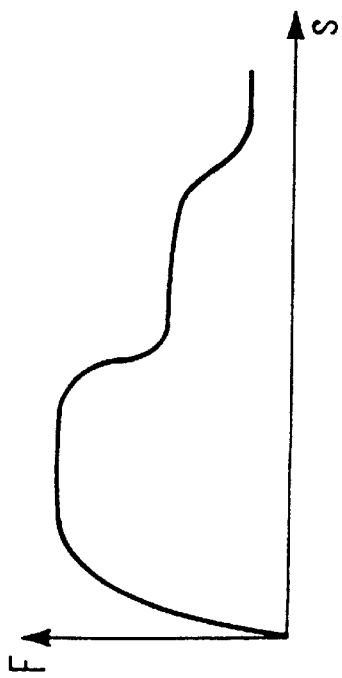
FIG. 3 is a diagram of the characteristic of the unit in accordance with the first embodiment.

The unit formed by the two torsion bars 10, 12 may be inserted in the belt retractor as shown in FIG. 1 such that the first axial end is fixedly connected to the belt reel and the second axial end is fixedly connected to the locking toothing. The characteristic of the belt webbing withdrawal force F over the length s of the withdrawn belt webbing as occurring in operation is evident from FIG. 3. In a first phase a high belt webbing withdrawal force occurs since in this case the two torsion bars are connected in parallel. Due to the second torsion bar 12 having a smaller wall thickness than the first torsion bar 10, the strength of the second torsion bar is less than that of the first torsion bar. Accordingly, after a predetermined twist between the first and second axial end of the two torsion bars 10, 12 the load limit of the second torsion bar 12 is reached and it shears off. Thus, only the first torsion bar 10 is effective between the first and second axial end and the available resisting torque is diminished. With progressive twisting between the two axial ends of the torsion bar 10, the latter begins to constrict as a result of which the available resisting torque is further diminished. A characteristic thus occurs which has three different force levels: a first high force level as determined by the two torsion bars connected in parallel, a lower second force level, determined by the first torsion bar 10 in the non-deformed condition, and finally an even lower third force level determined by the torsion bar 10 in the deformed condition.

Figure 2A:
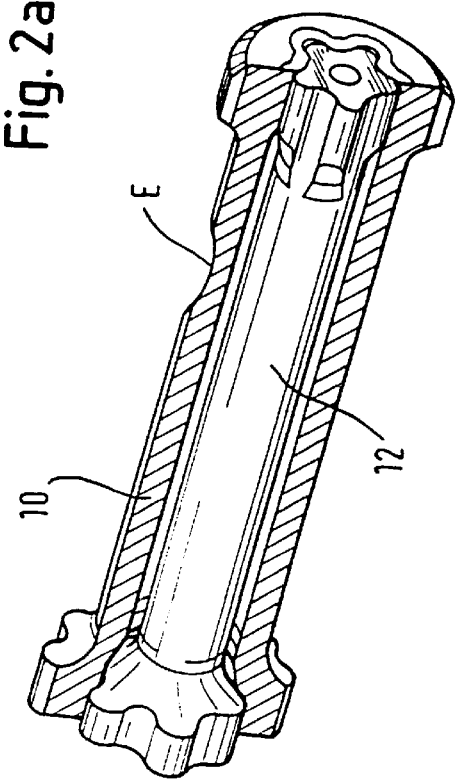
FIG. 2a is a perspective view of a unit serving as an alternative to the unit shown in FIG. 2.

FIG. 2a shows an embodiment as an alternative to the embodiment shown in FIG. 2. Here, both torsion bars 10, 12 are formed with splined ends whereby a form-locking engagement is achieved. The second torsion bar 12 is formed with a small end on the one side and a larger end at the other side so that it can be inserted into the first torsion bar 10 whereby simultaneously a form-locking engagement with the first torsion bar is achieved.

The first torsion bar formed from aluminum or an aluminum alloy is provided with a local neck E which when the torsion bar is twisted soon initiates that the torsion bar breaks whereby a degressive characteristic of the force limiter is achieved. The second torsion bar which may be made from aluminum, an aluminum alloy of from steel can be provided as a hollow or as a solid part depending on the desired characteristic.

Figure 5:
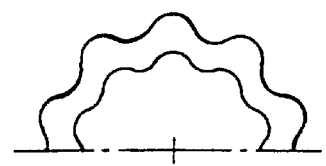
FIG. 5 is a schematic plan view of one axial end of the unit as shown in FIG. 4.
Figure 4:
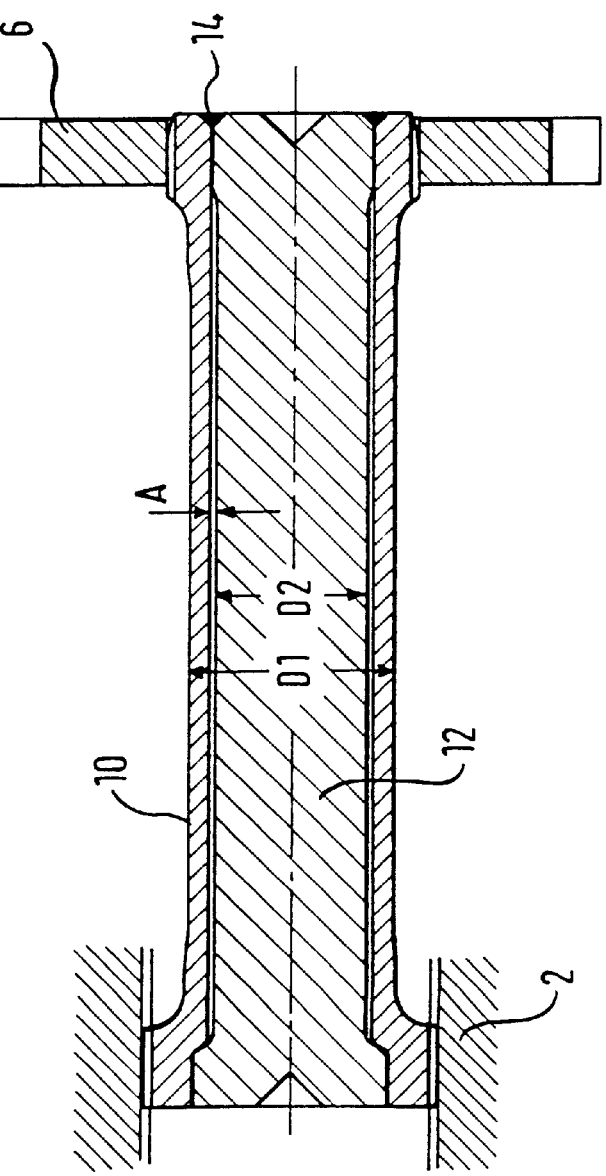
FIG. 4 is a section view of a unit in accordance with a second embodiment of the invention.

Referring now to FIGS. 4 and 5 there is illustrated a unit in accordance with a second embodiment of the invention. This embodiment corresponds basically to that as shown in FIG. 2 but is provided with a few modifications. In this embodiment the second torsion bar 12 is configured solid and not, as in the first embodiment, hollow. In this case, for assembling the two torsion bars, the first torsion bar 10 is slipped over the second torsion bar 12. At the second axial end a weld 14 may be provided to join the torsion bars to each other. Further, at the second end the locking toothing 6 is applied non-rotatably.

Another difference as compared to the first embodiment is that the first torsion bar 10 is not directly in contact with the second torsion bar. Instead, a cylindrical interspace having a wall thickness A of approximately 0.25 mm exists between the inner wall of the first torsion bar 10 and the outer wall of the second torsion bar 12, which outer wall is provided with a slide coating. In this embodiment the outer diameter of the second torsion bar 12 is approximately 9 mm and the outer diameter of the first torsion bar 10 is approximately 12 mm. Thus, when both torsion bars are twisted in common, the first torsion bar 10 may deform until it is supported by the outer surface of the second torsion bar 12.

Figure 6:
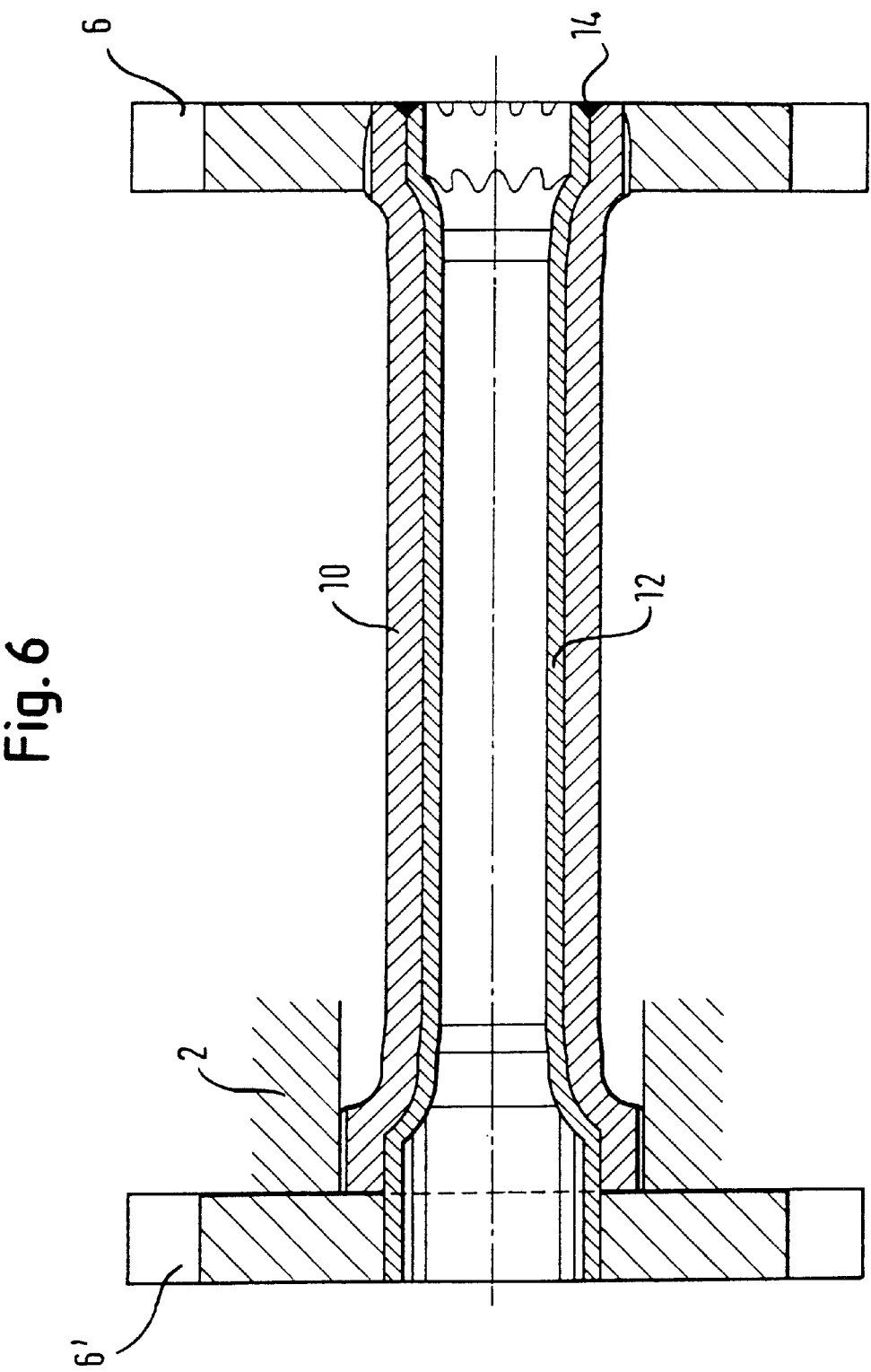
FIG. 6 is a section view of a unit in accordance with a third embodiment of the invention.

Referring now to FIG. 6 there is illustrated a unit in accordance with a third embodiment of the invention. In this embodiment too, the first torsion bar 10 is fixedly connected to the belt reel 2 at its first axial end. Provided at the second axial end of the torsion bar 10 is the locking toothing 6. In addition, the second torsion bar 12 is fixedly connected to the first torsion bar 10 at the second axial end whilst the two torsion bars are able to rotate relative to each other at the first axial end. At the first axial end the second torsion bar 12 is configured elongated and provided with a second locking toothing 6'.

It is in this way that by selectively blocking the two locking toothings 6, 6' two different switching conditions may be obtained which may be made use of—together with the variation of the characteristic resulting from the cooperation of the two torsion bars 10, 12—to freely adapt the belt webbing withdrawal force to the individual requirements. In a first switching condition in which the locking toothing 6 is blocked, only the first torsion bar 10 is active. That is, the resisting torque is determined exclusively by the moment of torsional resistance of the first torsion bar 10. In a second switching condition in which the locking toothing 6 is released, but the locking toothing 6' is blocked, the two torsion bars 10, 12 are connected in series, thus resulting in a lower resisting torque than in the first switching condition.

Figure 7:
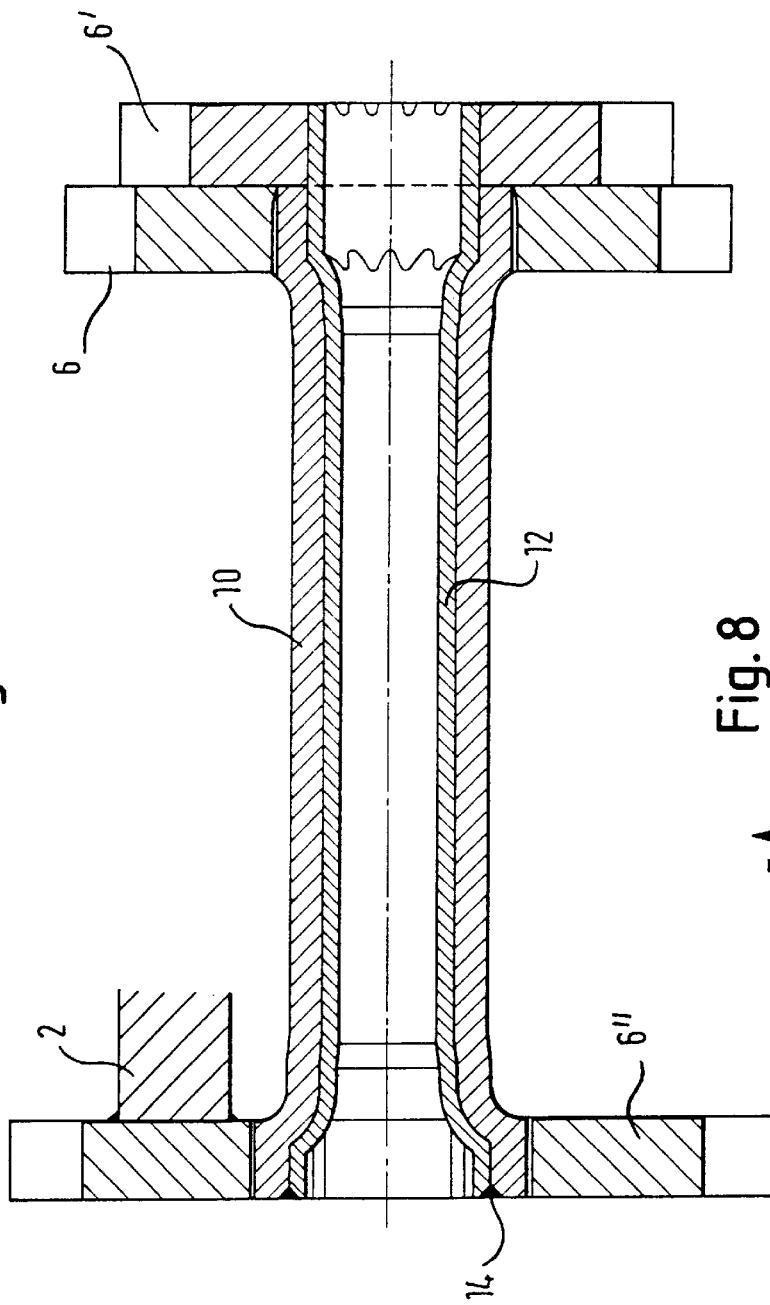
FIG. 7 is a section view of a unit in accordance with a fourth embodiment of the invention.

Referring now to FIG. 7 there is illustrated a unit in accordance with a fourth embodiment of the invention. In this embodiment the two torsion bars 10, 12 are fixedly connected to each other at the first axial end. Furthermore, a third locking toothing 6" is provided at this end. Finally, the belt reel 2 is also non-rotatably connected to this end of the two torsion bars.

At the second axial end the two torsion bars 10, 12 are able to rotate relative to each other. Provided on the first torsion bar 10 is a first locking toothing 6 and provided on the second torsion bar 12 is a second locking toothing 6'.

Figure 8:
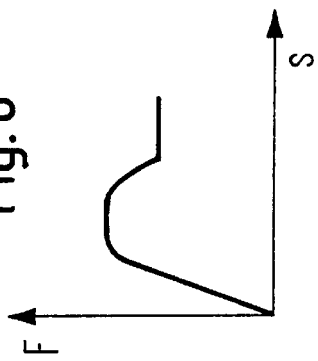
FIG. 8 a diagram of the characteristic of the unit in accordance with the fourth embodiment.

This embodiment permits two switching conditions for limiting the force, the corresponding characteristic is evident from FIG. 8. In a first condition resulting in a high belt webbing withdrawal force the two torsion bars 10, 12 are connected in parallel by the two locking toothings 6, 6' being blocked. In a second connecting condition only one of the torsion bars is active; the locking toothing belonging to the corresponding other torsion bar not being blocked.

The third locking toothing 6" serves to deactivate the force limiting function after a predetermined angle of rotation of the belt reel. For this purpose a blocking pawl (not shown in the FIGS.) is caused to engage the locking toothing 6", as a result of which the belt reel 2 is directly blocked. It is in this way that no further belt webbing can be withdrawn from the belt reel. Thus, for example, the maximum permissible angle of rotation of the belt reel may be limited to 400° to prevent such a length of belt webbing from being withdrawn that the vehicle occupant to be restrained would be able to move excessively forwards.

Figure 9:
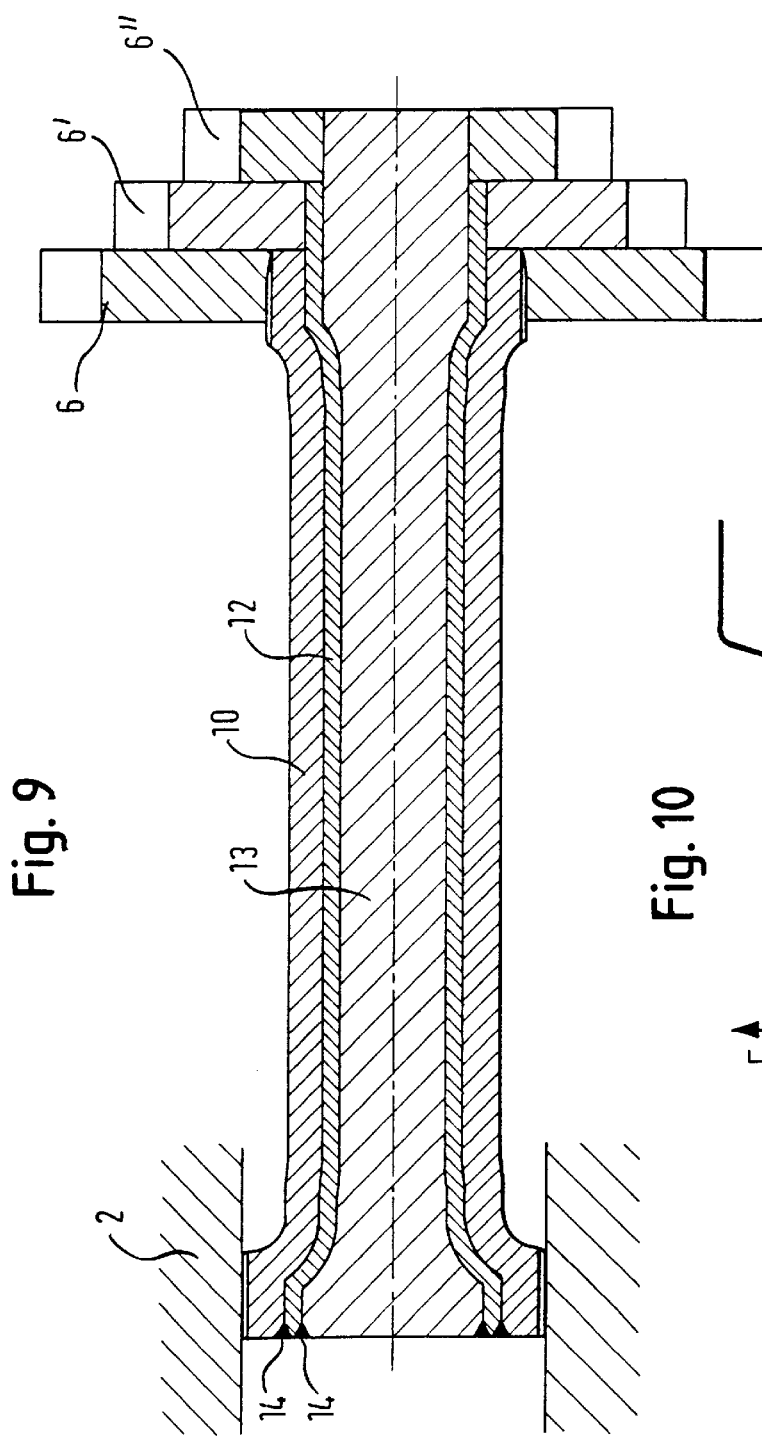
FIG. 9 is a section view of a unit in accordance with a fifth embodiment of the invention.

Referring now to FIG. 9 there is illustrated a unit in accordance with a fifth embodiment of the invention. In this embodiment three torsion bars are employed, the first torsion bar 10 and second torsion bar 12 being hollow and the third torsion bar 13 being configured as a solid torsion bar arranged in the interior of the second torsion bar 12. All three torsion bars are non-rotatably connected to each other by their first axial end and non-rotatably to the belt reel 2. At the second axial end the torsion bars are able to rotate relative to each other, it being at this end that each torsion bar is provided with a locking toothing 6, 6' and 6", respectively.

Figure 10:
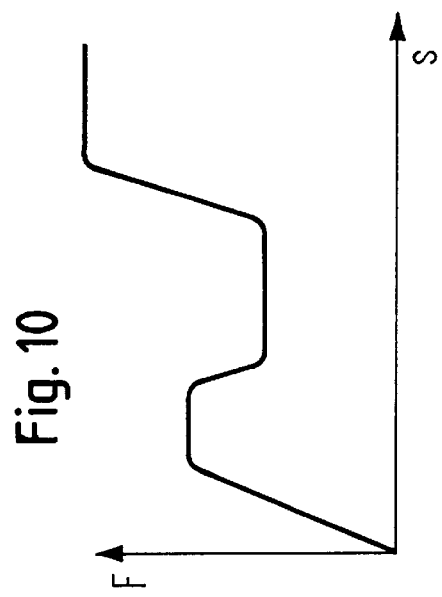
FIG. 10 shows a characteristic of the unit in accordance with the fifth embodiment.

With this assembly, the most various characteristics may be realized by individually combining the torsion rods being effective in each case. One example is shown in FIG. 10: in a first phase two torsion bars are employed so that a medium force level occurs, whereas in a second phase subsequent thereto only one torsion bar is still active so that a reduced force level occurs, before finally all three torsion bars are activated so that a high force level is achieved. A characteristic such as this is fundamentally desirable. During the first phase in which the vehicle occupant is restrained exclusively by the seat belt, the belt webbing withdrawal force is required to be just sufficient to exclude any injury to the vehicle occupant whilst achieving a high deceleration of the vehicle occupant, however. In a second phase in which the vehicle occupant dives into the gas bag deployed in front of the occupant, the belt webbing withdrawal force is required to decrease since otherwise together with the loading exerted by the gas bag on the trunk of the vehicle occupant, a load limit would be achieved in which injuries could not be excluded. In a third phase a high belt webbing withdrawal force is finally desirable to prevent the vehicle occupant from being displaced excessively forwards and, for example, penetrating the gas bag so as to contact the vehicle interior.

Figure 11:
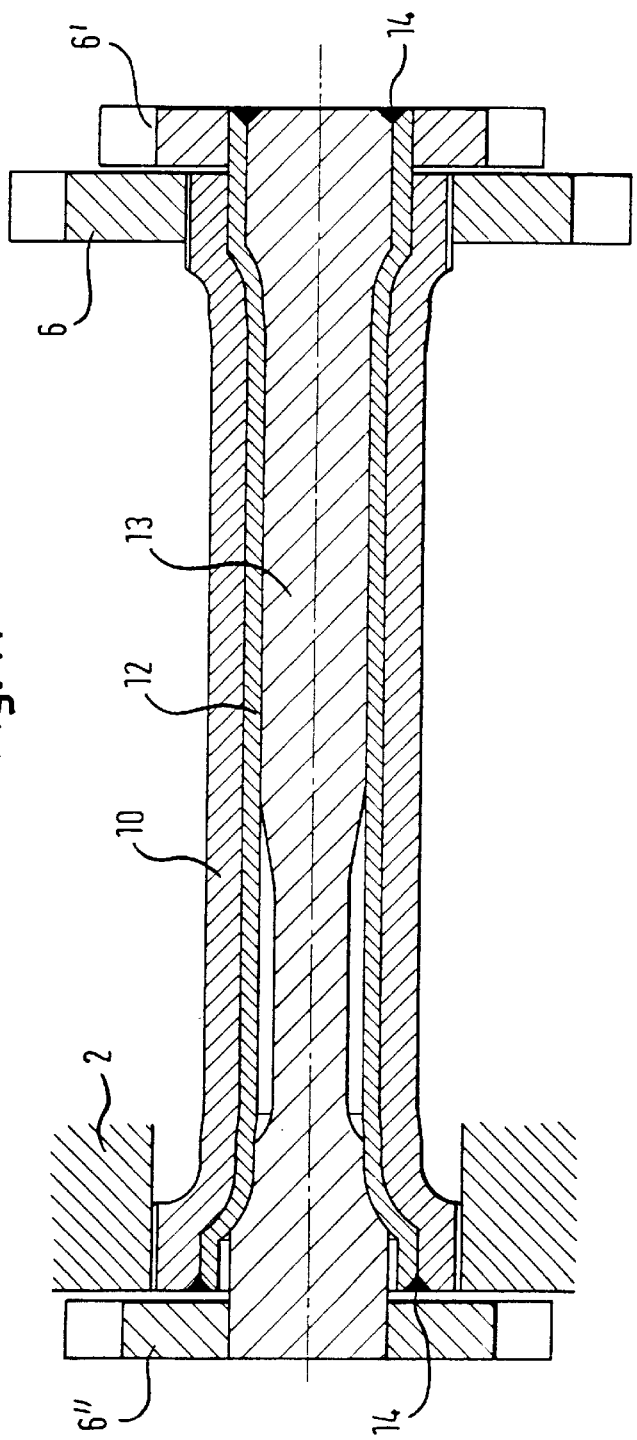
FIG. 11 is a section view of a unit in accordance with a sixth embodiment of the invention.
Figure 12:
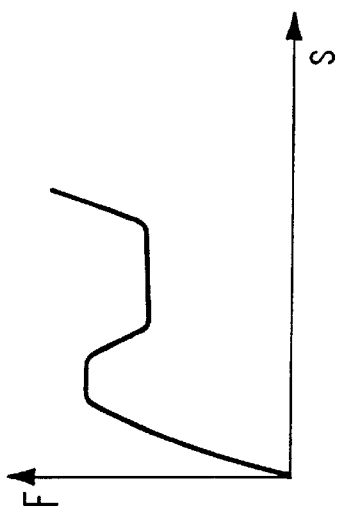
FIG. 12 shows a characteristic of the unit in accordance with the sixth embodiment.

Referring now to FIG. 11 there is illustrated a unit in accordance with a sixth embodiment of the invention. Here too, three torsion bars 10, 12, 13 are employed arranged inside one another. The first torsion bar 10, at its first axial end, is non-rotatably connected to the belt reel 2 and to the second torsion bar 12. At its second axial end the torsion bar 10 is provided with a locking toothing 6. The second torsion bar 12 is provided at its second axial end with a locking toothing 6' as well as being connected non-rotatably to the third torsion bar 13. The torsion bar 13 is configured solid and provided at its first axial end, at which it is able to freely rotate relative to the second torsion bar 12, with a third locking toothing 6".

Furthermore, the third torsion bar 13 is configured with a reduced cross-section in a portion between its first axial end and its middle, so that the second torsion bar 12 is no longer directly in contact with the third torsion bar 13 in this portion.

It is with this embodiment too, that a characteristic profile is achievable as known from FIG. 8 with respect to the fourth embodiment. A medium force level is achievable by blocking the locking toothing 6, for example. In this case only the first torsion bar 10 is active. As an alternative the second locking toothing 6' could be blocked whilst the first locking toothing 6 is free. In this case only the second torsion bar 12 would be active. A reduced force level is then achievable by blocking merely the third locking toothing 6" whilst the first and second locking toothing 6, 6' are free. In this case the second and third torsion bar 12, 13 are connected in series. A high force level is then achievable by blocking both locking toothings 6, 6' so that the two torsion bars 10, 12 are active in a manner connected in parallel.

Figure 13:
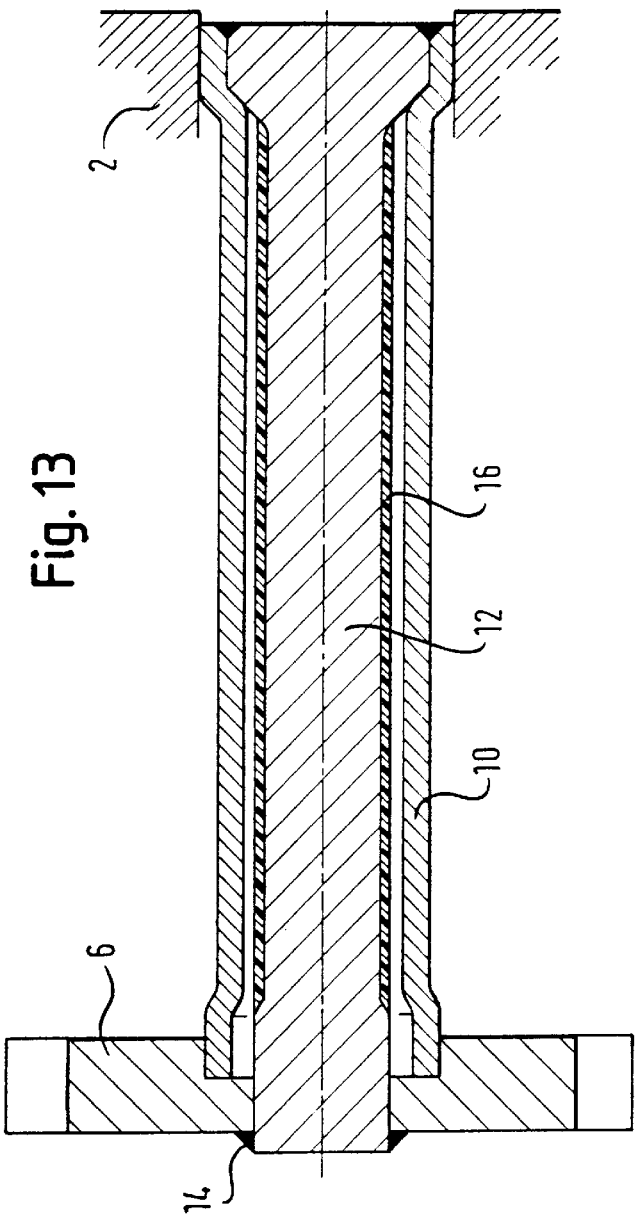
FIG. 13 is a section view of a unit in accordance with a seventh embodiment of the invention.

Referring now to FIG. 13 there is illustrated a unit in accordance with a seventh embodiment of the invention. Similar to the unit in accordance with the second embodiment a first torsion bar 10 and a second torsion bar 12 are employed, an interspace being provided between the two torsion bars. In addition a plastics coating 16 is applied to the outer surface of the second torsion bar 12, which coating acts as a sliding surface for the first torsion bar 10 and prevents the two torsion bars from spot welding cold under load. Instead of the plastics coating a spring steel support could be employed. The two torsion bars 10, 12 are non-rotatably connected to each other and to the belt reel 2 at their second axial ends. At the first axial end the second torsion bar 12 is non-rotatably connected to the locking toothing 6, this again being symbolized here by a weld 14. At its first axial end the first torsion bar 10 is received non-rotatably but axially shiftable in the locking toothing 6. For this purpose, a spline may be employed, for example.

Figure 16:
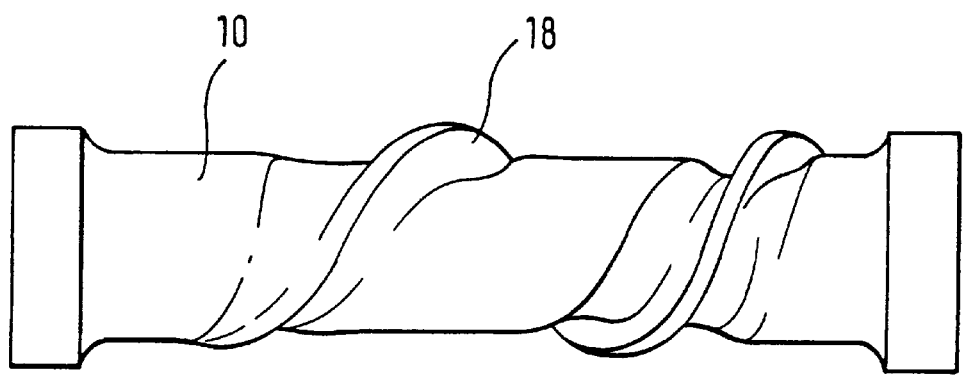
FIG. 16 is a side view of a torsion bar used in the unit in accordance with the seventh embodiment, in the twisted condition.

When a torque is now active between the locking toothing 6 and the belt reel 2, the two torsion bars 10, 12 are initially active in a manner connected in parallel. Due to the interspace between the inner surface of the first torsion bar 10 and the sliding surface furnished by the plastics coating 16 on the second torsion bar 10, the first torsion bar 10 begins to collapse as of a predetermined angle of rotation in forming a helical fold 18 (see FIG. 16). In the process, it is supported by the plastics coating 16 preventing a metal-to-metal contact between the two torsion bars and thus increased friction between them as could be caused for example by local cold spot welds. Due to the resulting fold 18 the first torsion bar 10 shortens to such an extent that it slips out of the locking toothing 16 at its first axial end. It is in this condition that only the second torsion bar 12 remains active.

The resulting fold is particularly influenced by the selected dimensions, it having proven to be good practice to select a value in the range 0.5 to 1.5 mm for the thickness A of the gap between the plastics coating 16 and the inner surface of the first torsion bar 10. The diameter of the second torsion bar is given by the desired moment of torsional resistance, usual diameters being in the range of approximately 8 mm to approximately 13 mm. The same applies to the wall thickness of the first torsion bar which depends on the selected diameter; this wall thickness usually being in the range 0.3 mm to 2 mm.

Figure 15:
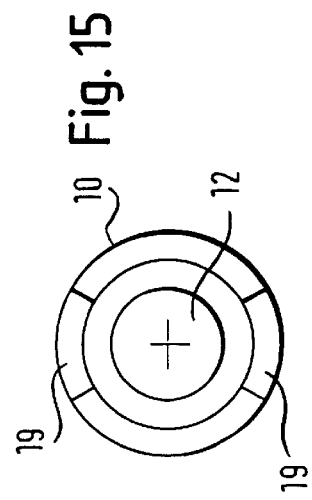
FIG. 15 is a plan view of an axial end of the variant as shown in FIG. 14.
Figure 14:
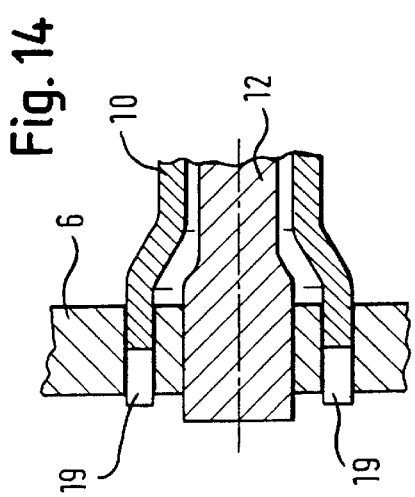
FIG. 14 is a section view of a variant of the seventh embodiment as shown in FIG. 13.

Referring now to FIGS. 14 and 15 there is illustrated a variant for the seventh embodiment. In this variant finger-like protuberances 19 are employed on the first axial end of the first torsion bar 10. These fingers engage corresponding recesses in the locking toothing 6. By suitably selecting the axial length of the protuberances 19 the angle may be determined at which the first torsion bar 10 is shortened to such an extent that it slips out of the locking toothing 6.

What is claimed is:

1. A unit comprising at least a first and a second torsion bar for limiting the force in a belt retractor, said first torsion bar being hollow and said second torsion bar being arranged in the interior of said first torsion bar, said first torsion bar having an inner diameter which is at least in part selected such that said first torsion bar is supported at least in a twisted condition by said second torsion bar, a torque which can be transmitted as a maximum by said first torsion bar differing from a torque which can be transmitted as a maximum by said second torsion bar, one of said first and second torsion bars being dimensioned such that with increasing loading it shears off so that only the remaining of said first and second torsion bars is involved in transmitting the torque.

2. The unit of claim 1, wherein a mount is provided in which one of said torsion bars engages with one end such that it is axially shiftable and non-rotatably with respect to said mount, said torsion bar being able to shorten with increasing loading and to slip out of said mount as a result of which only said remaining torsion bar is involved in transmitting the torque.

3. The unit of claim 1, wherein said torsion bars are non-rotatably connected to each other at a first axial end, a locking toothing being provided at each axial end of said first torsion bar, said locking toothing being non-rotatably connected to said first torsion bar, and a locking toothing being provided at a second axial end and being non-rotatably connected to said second torsion bar.

4. The unit of claim 1, wherein also said second torsion bar is hollow and a third torsion bar is provided arranged in the interior of said second torsion bar.

5. The unit of claim 4, wherein said three torsion bars are connected to each other at a first axial end, a locking toothing each being provided at a second axial end of said torsion bars.

6. The unit of claim 4, wherein said first torsion bar and said second torsion bar are fixedly connected to each other at a first axial end, wherein said second torsion bar and said third torsion bar are fixedly connected to each other at a second axial end, wherein said second axial ends of said first and second torsion bars are each provided with a locking toothing, and wherein said first axial end of said third torsion bar is provided with a locking toothing.

7. The unit of claim 1, wherein a cylindrical interspace is provided between an inner wall of said first torsion bar and an outer wall of said second torsion bar and wherein a sliding surface is formed on said outer wall of said second torsion bar.

8. The unit of claim 1, wherein at least one of said torsion bars is provided with a constriction.

9. The unit of claim 1, wherein one of said torsion bars is provided with a notch.

10. A belt retractor for a vehicle seat belt, comprising a unit as set forth in claim 1.

11. A unit comprising at least a first and a second torsion bar for limiting the force in a belt retractor, said first torsion bar being hollow and said second torsion bar being arranged in the interior of said first torsion bar, said first torsion bar having an inner diameter which is at least in part selected such that said first torsion bar is supported at least in a twisted condition by said second torsion bar, a cylindrical interspace being provided between an inner wall of said first torsion bar and an outer wall of said second torsion bar, a sliding surface being formed on said outer wall of said second torsion bar, said sliding surface being formed by a plastics coating on said second torsion bar.

* * * * *